United States Patent Office 3,236,665
Patented Feb. 22, 1966

3,236,665
SILICA REFRACTORY
Donald F. King, Pittsburgh, Pa., assignor to Harbison-Walker Refractories Company, Pittsburgh, Pa., a corporation of Pennsylvania
No Drawing. Filed Jan. 16, 1964, Ser. No. 337,996
6 Claims. (Cl. 106—69)

The present invention relates to improved silica refractory shapes and brick and, in particular, to impregnated silica shapes for use in glass tank furnaces.

Silica refractories are used extensively in the metallurgical industries on account of their desirable properties, particularly their high melting point and their rigidity and strength at high temperatures. For instance, they are used in the construction of roofs of open hearth steel furnaces, which represent perhaps the most severe operating conditions to which these refractories are exposed. Silica refractories are also used extensively in the glass industry for lining the crowns and other parts of the glass tank furnaces. These refractories are desirable in this latter environment owing to their ability to withstand the corrosive atmosphere prevailing in glass melting furnaces. It is highly desirable in the applications above mentioned that the silica brick be of relatively high density and strength and relatively low porosity.

Silica brick are commonly made from quartzite or silica rock to which a bonding agent, such as, the oxides of calcium, megnesium, strontium, manganese, zinc, nickel, cobalt, and iron, is added. Typical practice is to crush and grind the rock to provide a suitable proportion of coarse and fine grain sizes. The sized rock is then mixed with one of the binders mentioned, and water, and refractory shapes are made from the mixed batch as by power pressing, impact pressing, or hand molding processes in accordance with standard techniques developed in the production of silica refractories.

It is an object of the present invention to provide silica brick with increased density and strength and decreased porosity than is presently experienced.

Other objects of the invention will become apparent hereinafter.

We have discovered, and it is upon this that our invention is in large part predicated, that by impregnating fired silica brick with high purity, aqueous colloidal silica, the brick has enhanced strength and improved density and a very appreciable reduction in porosity without impairing the refractoriness of said brick.

The glass industries have found, that silica brick, after extended use in the crowns of the glass tank furnaces, become coated with a film of what is referred to in the art as "tridymite fuzz" which is deleterious to glass manufacture. We have discovered that by impregnating the silica brick with colloidal silica, the formation of tridymite fuzz is effectively curtailed.

Briefly, in accordance with the present invention, there is provided a silica refractory brick formed from a batch consisting of, by weight, from about 1 to 5% of one or more of the oxides of calcium, magnesium, strontium, manganese, zinc, nickel, cobalt and iron. There is also typically present alumina in the amount of 0.6% or less, titania in an amount of 0.5% or less and alkalies in an amount of 0.5% or less. The balance of the brick consists of silica rock which may be in the form of quartzite or silica rock. See, for example, the U.S. patent to Harvey et al., 2,351,204, for a preferred silica brick. The fired brick is impregnated throughout its interstices with a high purity aqueous colloidal silica.

The colloidal silica impregnant employed in the present invention typically contains from about 15 to 50% of $SiO_2$ based on a total solids content. The colloidal silica may also contain up to a 1% maximum of a stabilizer, such as, ammonia and sodium; however, an ammonia stabilizer is preferable since it volatizes at elevated temperatures. Other volatile stabilizers, of course, may be employed without departing from the spirit of the invention. Also, the colloidal silica employed herein has a pH of from about 3.5 to 10.5; however, the pH of many of the colloidal silica solutions employed have been found to fall between 8 and 10. Such colloidal silica are commercially available items of commerce.

Table I below lists several of the colloidal silica emulsions suggested for use in the present invention. The silica refractory shapes are conveniently prepared by making a batch by crushing and thoroughly blending the components and mixing with a tempering and/or bonding agent.

TABLE I

| | A | B | C | D | E | F | G | H | I | J | K | L | M |
|---|---|---|---|---|---|---|---|---|---|---|---|---|---|
| Percent Colloidal Silica as $SiO_2$ | 30 | 30 | 30 | 15 | 15 | 15 | 30 | 35 | 50 | 22 | 30 | 40 | 40 |
| Stabilizer and percentage in parenthesis | $NH_3$ (.26) | $Na_2O$ (.1) | $Na_2O$ (.4) | $Na_2O$ (.7) | $Na_2O$ (.04) | $Na_2O$ (.4) | $Na_2O$ (.1) | $Na_2O$ (.1) | $Na_2O$ (.1) | | | | |
| pH at 25° C | 9.5 | 9.8 | 8.4 | 8.5 | 8.6 | 10.2 | 8.6 | 3.7 | 3.7 | 9.9 | 9.3 | 9.9 | 9.3 |
| Average Particle size (mu) | 15 | 15 | 15 | 7 | 8 | 13 | 19 | 19 | 19 | 37 | 17 | 37 | 17 |

The batch is compressed into brick on a brick press at a pressure of from about 2000 to 8000 p.s.i. The green brick are dried and then fired in a kiln at a temperature of from 2300 to 2700° F. The fired brick are cooled and impregnated with colloidal silica by immersing them in a vessel containing the colloidal silica bath for about one-half hour. The vessel may be evacuated or subjected to pressure or both to facilitate impregnation.

A plurality of silica brick were prepared having the composition disclosed in U.S. Patent 2,351,204, by Harvey et al. The components were crushed and blended together to give a typical brickmaking grind as follows:

Percent
- −6+10 Tyler mesh _____ 10
- −10+28 _____ 30
- −28+65 _____ 15
- −65 _____ 45

About 5%, by weight, of water was added as a tempering agent. The batch was then pressed into a plurality of brick, measuring 9×4½×3", at about 4000 p.s.i. The brick were removed from the press, dried and fired at a temperature of about 2550° F. The brick were placed in a vessel and immersed in a colloidal silica suspension as indicated in the tables following. The impregnant is indicated by a letter with reference to Table I.

In the preferred embodiment, a vessel is evacuated to about 700 millimeters of Hg until no bubbles can be observed leaving the brick. The vacuum is then broken and the samples are removed from the solution and dried.

Brick made in this manner were tested for density, porosity, and modulus of rupture and the results are indicated below in Table II.

TABLE II

| Impregnant | None | G | H |
|---|---|---|---|
| Density (p.c.f.) | 114 | 120 | 123 |
| Porosity (percent) | 22 | 17.8 | 15.2 |
| Modulus of Rupture (p.s.i.) | 720 | 980 | 1,200 |

It is apparent that impregnation, with the "G" impregnant, caused increased density and modulus of rupture and reduced porosity as compared with the brick that was unimpregnated. These properties were further enhanced with the use of the "H" impregnant which contained additional $SiO_2$.

Another brick sample (of manufacture the same as above) was impregnated with a different grade of colloidal silica as indicated in Table III below. The impregnated brick were tested as above and the results tabulated in Table III.

TABLE III

| Impregnant | A | None |
|---|---|---|
| Density (p.c.f.) | 117 | 106 |
| Porosity (percent) | 16.7 | 26.3 |
| Modulus of Rupture (p.s.i.) | 1,130 | 690 |

Here also, the results indicate an appreciable increase in density and modulus of rupture and a decrease in porosity of the impregnated as compared with the non-impregnated brick.

Several similar brick samples were tested to determine the effect of more than one impregnation treatment. The brick were tested to determine the permeability (which is a good indication of relative porosity) and the results are tabulated below in Table IV.

TABLE IV

| Impregnant | G | G | None |
|---|---|---|---|
| Number of Treatments | 3 | 1 | |
| Permeability, K [1] | 0.0 | 0.24 | 0.96 |

[1] K=cu. in. gas per sq. in. of area, sec. of time and lbs. pressure per in. of thickness.

The results indicate that a single impregnation treatment with the "G" impregnant showed a marked decrease in permeability, and thus porosity, as compared with the untreated brick. Further, the results indicate an additional decrease in porosity and permeability for the brick impregnated in 3 treatments.

It is apparent from the foregoing that fired silica refractory brick impregnated with a high purity, aqueous colloidal silica, had superior properties as compared with the same silica brick without impregnation.

It should be understood that other silica brick compositions, such as, those classified under ASTM Designation C 416-60, may be impregnated in accordance with this invention.

Colloidal silica and phosphoric acid have been employed to impregnate graphite shapes to improve the oxidation resistance thereof (U.S. Patent 2,897,102). Colloidal silica has also been employed in combination with cement to impregnate porous concrete (see U.S. Patent No. 2,434,301).

While the invention has been described with reference to particular embodiments and examples, it will be understood, of course, that modifications, substitutions and the like may be made therein without departing from its scope.

I claim:

1. As a glass tank furnace lining, fired silica refractory brick comprising from about 1 to 5% of at least one oxide of the group consisting of oxides of calcium, magnesium, strontium, manganese, zinc, nickel, cobalt and iron, the balance silica rock, and impregnated throughout its interstices with a high purity, aqueous, colloidal silica, said colloidal silica containing from about 15 to 50%, by weight, $SiO_2$, on an oxide basis, and up to 1% maximum of a stabilizer.

2. A fired silica refractory brick suitable for use in a glass tank furnace formed from a batch consisting of, by weight, from about 1 to 5% of at least one oxide of the group consisting of oxides of calcium, magnesium, strontium, manganese, zinc, nickel, cobalt and iron, the balance silica rock, and impregnated throughout its interstices with a high purity, aqueous, colloidal silica, said colloidal silica containing from about 15 to 50%, by weight, $SiO_2$, on an oxide basis, and up to 1% maximum of a stabilizer.

3. The product of claim 2 in which the stabilizer is selected from the group consisting of ammonia and $Na_2O$.

4. A fired silica refractory brick suitable for use in a glass tank furnace formed from a batch consisting of, by weight, from about 1 to 5% of at least one oxide of the group consisting of oxides of calcium, magnesium, strontium, manganese, zinc, nickel, cobalt and iron and the balance silica rock and impregnated throughout its interstices with a high purity, aqueous, colloidal silica containing about 30%, by weight, of $SiO_2$, on an oxide basis, and about 0.26% of $NH_3$.

5. A method for producing a silica refractory brick comprising disposing a batch consisting of, by weight, from about 1 to 5% of at least one oxide of the group consisting of oxides of calcium, magnesium, strontium, manganese, zinc, nickel, cobalt and iron and the balance silica rock, in a mold, compressing the batch at a pressure of from 2000 to 8000 p.s.i., firing the shape at a temperature of from 2300° to 2700° F., and immersing the shape in a bath of high purity, aqueous colloidal silica for a period of time sufficient to impregnate throughout interstices in said shape.

6. A method for producing a silica refractory brick comprising a batch consisting of, by weight, from about 1 to 5% of at least one oxide of the group consisting of oxides of calcium, magnesium, strontium, manganese, zinc, nickel, cobalt and iron and the balance silica rock, in a mold, compressing the batch at about 4000 p.s.i., firing the shape at about 2550° F. and immersing the shape in a bath of high purity, aqueous colloidal silica for a period of time sufficient to impregnate throughout interstices in said shape, said colloidal silica containing about 30%, by weight, $SiO_2$, on an oxide basis, and 0.26% of $NH_3$.

References Cited by the Examiner

UNITED STATES PATENTS 2,351,204  6/1944  Harvey et al. _____ 106—69
3,177,161  4/1965  Smith-Johannsen _____ 106—69

TOBIAS E. LEVOW, *Primary Examiner.*

J. POER, *Assistant Examiner.*